UNITED STATES PATENT OFFICE.

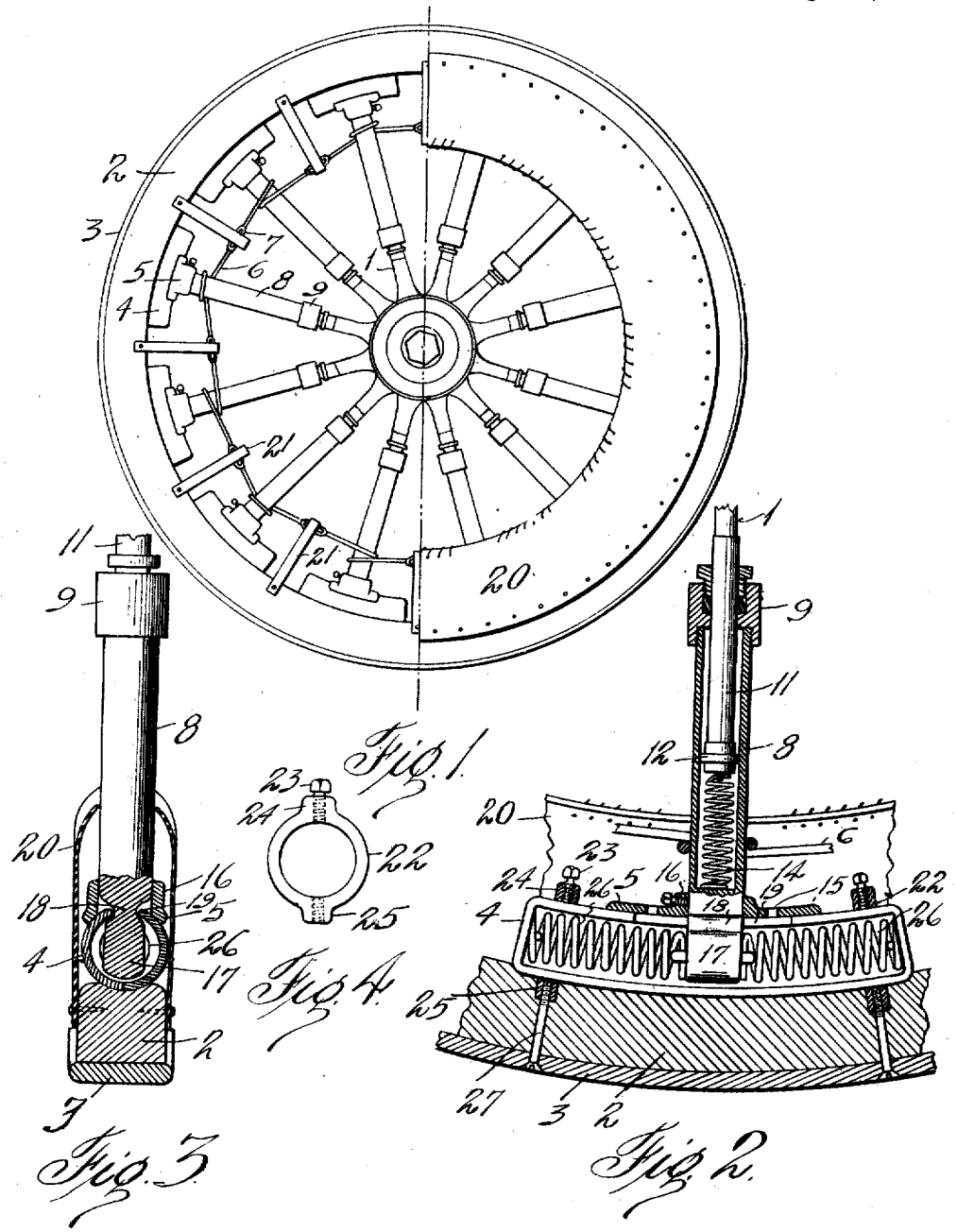

ROBERT L. WATTS AND AUGUSTUS G. ONSTEAD, OF WAXAHACHIE, TEXAS, ASSIGNORS, BY DIRECT AND MESNE ASSIGNMENTS, OF ONE-HALF TO SAID AUGUSTUS G. ONSTEAD AND ONE-HALF TO JAMES F. ERBY, OF WAXAHACHIE, TEXAS.

RESILIENT VEHICLE-WHEEL.

1,004,318.  Specification of Letters Patent.  Patented Sept. 26, 1911.

Application filed December 27, 1910. Serial No. 599,360½.

*To all whom it may concern:*

Be it known that we, ROBERT L. WATTS and AUGUSTUS G. ONSTEAD, citizens of the United States, residing at Waxahachie, in the county of Ellis and the State of Texas, have invented a new Resilient Vehicle-Wheel, of which the following is a specification.

This invention pertains to resilient vehicle wheels.

The objects of the invention are; the provision of a rigid hub member having resilient spokes radiating therefrom and supporting an ordinary felly and each spoke having its outer end engaging in a casing carried by the felly; the provision of a spacing member uniting the spokes; the provision of a boot attached to the felly and covering the casings and uniting member; and the provision of a casing for the outer end of each spoke, each casing being made in two sections, containing opposed springs on opposite sides of the spoke, having a spoke receiving slot and cover plate; and the provision of devices for holding the sections of the casings together and fastening them to the felly.

A still further object of the invention is to provide a wheel of the character described that will be strong, durable, efficient, and simple and inexpensive to construct, also one in which the several parts will not be likely to get out of working order.

With the above and other objects in view the invention has relation to certain novel features and construction and operation, an example of which is described in the following specification and illustrated in the accompanying drawings, wherein:

Figure 1 is a side elevation of the wheel, half of the boot being omitted, Fig. 2 is a detail in vertical section, Fig. 3 is another detail in vertical section at right angles to Fig. 2, and Fig. 4 is a detail of one of the casing rings.

In the drawings the numeral 1 designates a rigid hub member having short rigid spoke portions extending radially therefrom and receiving metallic spoke members 11. These spoke members telescope into spoke sleeves 8 through stuffing boxes 9. As each spoke construction is the same a description of one will suffice for all.

On the end of the spoke member 11 a plunger head 12 is secured and this with the stuffing box holds the member in concentric relation to the sleeve. The outer end of the sleeve terminates in a shoe 17. Within the sleeve a coil spring 14 extends between the plunger head and the shoe and is attached to these parts. Said spring may be compressed or extended. The shoe projects into a casing 4 which is made in two half sections as shown in Fig. 3. The casing is curved to fit the inner periphery of a felly 2 and may be slightly embedded therein if desired. At each end the half sections are clamped together and embraced by rings 22 having lugs 24 and 25 which are screw threaded. The felly has a tire 3 and through this tire and the felly screw-bolts 27 are passed and engaged in the lugs 25 of the rings, thus fastening the casing to the felly. Set screws 23 are passed through the lugs 24 and impinge the casing sections so as to hold them in firm position. The half sections of the casing are cut out along their upper adjacent edges to form slots 19. The shoe 17 has recesses on opposite sides formed by a reduced portion 18, the slotted portions of the half sections being received in the recesses. Springs 26 extend from opposite sides of the shoe in the casing, being in opposed relation and having their ends attached to the shoe and the ends of the casing. A cover plate 5 fitting on the casing covers the slot and has length sufficient to permit a movement longitudinally thereof without exposing said slot. Oil holes 15 are provided in the plate whereby oil may be introduced into the casing. The plate has a collar 16 by which it is secured about the sleeve 8.

It is apparent that the springs 26 permit lateral spokes to yield when upper and lower spokes are extended or contracted and thus all parts of wheel are yieldably supported.

In order to maintain a relative position between the spokes a uniting member is employed. This member comprises links 6 one of which is coiled about each sleeve 8 and has its free ends directed toward the next adjacent spokes. Between each pair of spokes the adjacent ends of the ties are engaged in turn buckles 7, by adjusting which the spokes may be properly spaced apart and held in relative position.

For protecting the casings 4 and the uniting member from mud and water a boot 20 is provided. This boot is composed of two sections or sides, each secured along its lower edge to the side of the felly; while the upper edges are laced together between the spokes and drawn snugly about the latter. Within the boot supports 21 extend inwardly from the felly and act to prevent the boot which is formed of a suitable pliable material, from wrinkling.

What we claim, is:

In a resilient vehicle wheel, a rigid hub member, metallic spoke members radiating from the hub member, plunger heads secured on the spoke members, spoke sleeves receiving the spoke members and plunger heads, coiled springs confined in the sleeves, shoes, one being provided on each sleeve, each shoe having a reduced portion, casings, one for each shoe, each casing comprising two sections having slotted portions, each shoe having its reduced portion engaging in the slotted portions of the casing sections, springs, a pair of springs in each casing on opposite sides of the shoe thereof, cover plates, one secured to each sleeve and lying over the slotted portion of the adjacent casing, a felly, a tire surrounding the felly, the casings being curved and fitting the inner periphery of the felly, rings receiving the sections of the casings, set screws passed through the rings and engaged with the casing sections, fastenings passing through the tire and felly and engaging the rings, and a hood secured to the felly and covering the casings, said hood being laced together between the spoke sleeves.

ROBERT L. WATTS.
AUGUSTUS G. ONSTEAD.

Witnesses:
W. M. TIDWELL,
BRICE BURGESS.